United States Patent
Vassilieva et al.

(10) Patent No.: US 9,100,137 B2
(45) Date of Patent: Aug. 4, 2015

(54) CROSSTALK REDUCTION IN OPTICAL NETWORKS USING VARIABLE SUBCARRIER SPECTRAL ALLOCATION

(71) Applicant: Fujitsu Limited, Kawasaki-shi, Kanagawa (JP)

(72) Inventors: Olga Vassilieva, Plano, TX (US); Motoyoshi Sekiya, Richardson, TX (US); Takeshi Hoshida, Kawasaki (JP)

(73) Assignee: Fujitsu Limited, Kawasaki-shi (JP)

( * ) Notice: Subject to any disclaimer, the term of this patent is extended or adjusted under 35 U.S.C. 154(b) by 0 days.

(21) Appl. No.: 14/031,809

(22) Filed: Sep. 19, 2013

(65) Prior Publication Data

US 2014/0314415 A1     Oct. 23, 2014

Related U.S. Application Data

(60) Provisional application No. 61/814,565, filed on Apr. 22, 2013.

(51) Int. Cl.
*H04J 14/02* (2006.01)

(52) U.S. Cl.
CPC ......... *H04J 14/0227* (2013.01); *H04J 14/0224* (2013.01); *H04J 14/0254* (2013.01); *H04J 14/0257* (2013.01); *H04J 14/0298* (2013.01); *H04J 14/0201* (2013.01)

(58) Field of Classification Search
USPC .................................... 398/68–73, 79, 81, 91
See application file for complete search history.

(56) References Cited

U.S. PATENT DOCUMENTS

| | | | |
|---|---|---|---|
| 5,784,170 A | | 7/1998 | Park et al. ...................... 359/133 |
| 6,118,561 A | * | 9/2000 | Maki .................................. 398/1 |
| 8,009,985 B1 | * | 8/2011 | Roberts et al. .................. 398/47 |
| 2012/0269506 A1 | | 10/2012 | Vassilieva et al. .............. 398/26 |
| 2013/0322877 A1 | * | 12/2013 | Geyer et al. ..................... 398/38 |

OTHER PUBLICATIONS

K. Igarashi et al., "Bit-error Rate Performance of Nyquist Wavelength-Division Multiplexed Quadrature Phase-Shift Keying Optical Signals", OFC/NFOEC'2011, OMR6, 3 pages, 2011.

G. Bosco et al., "Performance limits of Nyquist-WDM and COOFDM in high-speed PM-QPSK systems", IEEE Photon. Technol. Lett., 22, 3 pages, 2010.

P. Mitra et al., "Nonlinear limits to the information capacity of optical fibre communications", Nature, 411, 4 pages, 2001.

Gavioli et al., "Experimental Investigation of PDM-QAM16 transmission at 112 Gbit/s over 24000 km", Proc. OFC'10, OThD3, 3 pages, 2010.

European Search Report issued in European Patent Appl. No. 14155321.4, dated Oct. 15, 2014, 7 pages.

(Continued)

*Primary Examiner* — David Payne
*Assistant Examiner* — Casey Kretzer
(74) *Attorney, Agent, or Firm* — Baker Botts L.L.P.

(57) ABSTRACT

A method and system for reducing crosstalk among subcarriers of a super-channel may apply a frequency shift to selected intermediate subcarrier bands upon optical modulation. The frequency shift may be applied to equally spaced optical frequencies between a first optical frequency and a last optical frequency respectively corresponding to two end subcarrier bands that define a fixed bandwidth of the super-channel. The frequency shift may result in the intermediate subcarrier bands being optically modulated at variably spaced optical frequencies within the fixed bandwidth of the super-channel.

18 Claims, 5 Drawing Sheets

(56) References Cited

OTHER PUBLICATIONS

G. Bosco et al., "On the Performance of Nyquist-WDM Terabit Superchannels Based on PM-BPSK, PM-QPSK, PM-8QAM or PM-16QAM Subcarriers", Journal of Lightwave Technology, IEEE Service Center, vol. 29, No. 1, 9 pages, Jan. 1, 2011.

O. Vassilieva et al., "Systematic Analysis of Intra-Superchannel Nonlinear Crosstalk in Flexible Grid Networks", *ECOC*, 3 pages, 2014.

* cited by examiner

CROSSTALK REDUCTION IN OPTICAL NETWORKS USING VARIABLE SUBCARRIER SPECTRAL ALLOCATION

CROSS-REFERENCE TO RELATED APPLICATION

This application claims priority from U.S. Provisional Application No. 61/814,565 filed Apr. 22, 2013, which is hereby incorporated by reference.

BACKGROUND

1. Field of the Disclosure

The present disclosure relates generally to optical communication networks and, more particularly, to a system and method for reducing crosstalk in optical networks using variable subcarrier spectral allocation.

2. Description of the Related Art

Telecommunications systems, cable television systems and data communication networks use optical networks to rapidly convey large amounts of information between remote points. In an optical network, information is conveyed in the form of optical signals through optical fibers. Optical networks may also include various network elements such as amplifiers, dispersion compensators, multiplexer/demultiplexer filters, wavelength selective switches, couplers, etc. configured to perform various operations within the network.

Optical super-channels are an emerging solution for transmission of signals at 400 Gb/s and 1 Tb/s data rate per channel. A typical super-channel may include a set of subcarriers that are frequency multiplexed to form a single wavelength channel. The super-channel may then be transmitted through an optical network as a single channel across network endpoints. The subcarriers within the super-channel may be tightly packed to achieve high spectral efficiency. In order to minimize linear crosstalk between neighboring subcarriers, Nyquist filtering may be applied at the transmitter end of the optical network.

SUMMARY

In one aspect, a method of reducing crosstalk among subcarriers of a super-channel includes receiving a plurality of data streams for transmission over an optical transport network as the super-channel, the super-channel comprising a plurality of subcarrier bands, including two edge subcarrier bands. The method may include assigning optical frequencies to the subcarrier bands, including respectively assigning the two edge subcarrier bands to a first optical frequency and a last optical frequency that define a fixed bandwidth of the super-channel. The remaining subcarrier bands may be respectively assigned to equally spaced optical frequencies between the first optical frequency and the last optical frequency (i.e., within the fixed bandwidth). The method may include selecting, from the remaining subcarrier bands, at least two intermediate subcarrier bands and optically modulating the data streams into the subcarrier bands using the assigned optical frequencies. A frequency shift is applied to the equally spaced optical frequencies of the intermediate subcarrier bands, the frequency shift resulting in the intermediate subcarrier bands being optically modulated at variably spaced optical frequencies between the first optical frequency and the last optical frequency (i.e., within the fixed bandwidth). The method may further include combining the subcarrier bands into the super-channel.

Other disclosed aspects include an optical network controller and an optical transport network for reducing crosstalk among subcarriers of a super-channel using variable subcarrier spectral allocation, as described herein.

BRIEF DESCRIPTION OF THE DRAWINGS

For a more complete understanding of the present invention and its features and advantages, reference is now made to the following description, taken in conjunction with the accompanying drawings, in which.

DESCRIPTION OF THE EMBODIMENT(S)

Figure 1:
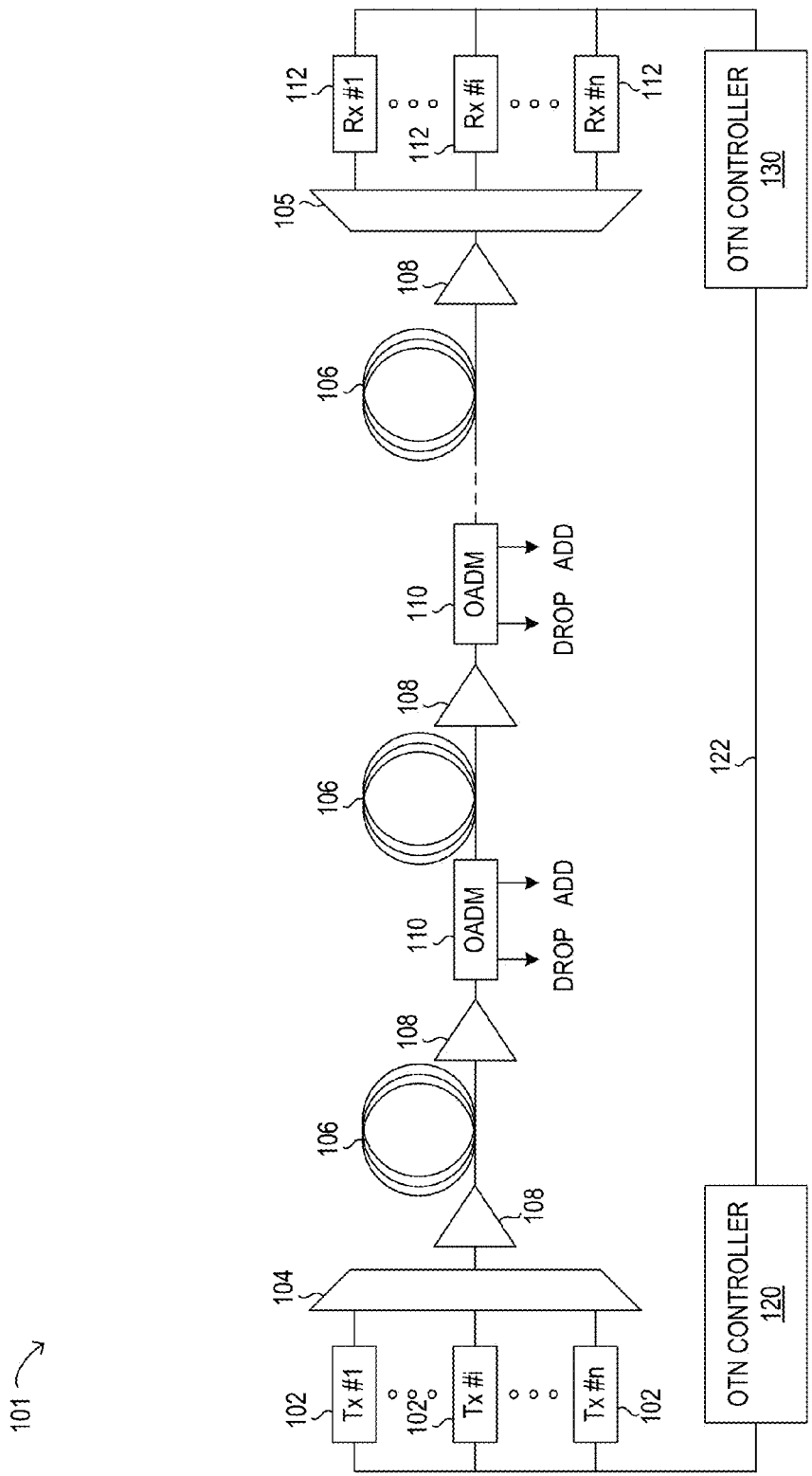
FIG. 1 is a block diagram of selected elements of an embodiment of an optical transport network.

In the following description, details are set forth by way of example to facilitate discussion of the disclosed subject matter. It should be apparent to a person of ordinary skill in the field, however, that the disclosed embodiments are exemplary and not exhaustive of all possible embodiments.

As used herein, a hyphenated form of a reference numeral refers to a specific instance of an element and the un-hyphenated form of the reference numeral refers to the collective or generic element. Thus, for example, widget "72-1" refers to an instance of a widget class, which may be referred to collectively as widgets "72" and any one of which may be referred to generically as a widget "72".

Turning now to the drawings, FIG. 1 illustrates an example embodiment of optical transport network (OTN) 101. Optical transport network 101 may include one or more optical fibers 106 configured to transport one or more optical signals communicated by components of optical transport network 101. The network elements of optical transport network 101, coupled together by fibers 106, may comprise one or more transmitters 102, one or more multiplexers (MUX) 104, one or more amplifiers 108, one or more optical add/drop multiplexers (OADM) 110, and one or more receivers 112.

Optical transport network 101 may comprise a point-to-point optical network with terminal nodes, a ring optical network, a mesh optical network, or any other suitable optical network or combination of optical networks. Optical fibers 106 comprise thin strands of glass capable of communicating the signals over long distances with very low loss. Optical fibers 106 may comprise any suitable type of fiber, such as a Single-Mode Fiber (SMF), Enhanced Large Effective Area Fiber (ELEAF), or a TrueWave® Reduced Slope (TW-RS) fiber.

Optical transport network 101 may include devices configured to transmit optical signals over fibers 106. Information may be transmitted and received through optical transport network 101 by modulation of one or more wavelengths of light to encode the information on the wavelength. In optical networking, a wavelength of light may also be referred to as a channel. Each channel may be configured to carry a certain amount of information through optical transport network 101.

To increase the information carrying capabilities of optical transport network 101, multiple signals transmitted at multiple channels may be combined into a single optical signal, which is referred to herein as a "multi-carrier" optical signal, while the individual channels included in a multi-carrier optical signal are referred to herein as "subcarriers". The process of communicating information at multiple channels of a single optical signal is referred to in optics as wavelength division multiplexing (WDM). Dense wavelength division multiplexing (DWDM) refers to the multiplexing of a larger (denser) number of wavelengths, usually greater than forty, into a fiber. WDM, DWDM, or other multi-wavelength transmission techniques are employed in optical networks to increase the aggregate bandwidth per optical fiber. Without WDM or DWDM, the bandwidth in optical transport networks may be limited to the bit-rate of solely one wavelength. With more bandwidth, optical transport networks are capable of transmitting greater amounts of information. Optical transport network 101 may be configured to transmit disparate channels using WDM, DWDM, or some other suitable multi-carrier multiplexing technique, and to amplify the multi-carrier signal.

Recently, advancements in DWDM enabled combining several optical carriers to create a composite optical signal of a desired capacity. One such example of a multi-carrier optical signal is a super-channel, which is an example of high spectral efficiency (SE) that may attain transmission rates of 100 Gb/s or higher. Thus, in a super-channel, subcarriers are tightly packed and consume less optical spectrum than channels in conventional DWDM. Another distinctive feature of super-channels is that the subcarriers in a super-channel travel from the same origin to the same destination, and are not added or removed using an OADM while in transmission. Techniques for achieving high spectral efficiency (SE) in optical networks may include the use of subcarriers of the super-channels modulated using dual-polarization quadrature phase-shift keying (DP-QPSK) for long-haul transmission at data rates of 100 Gb/s or greater. In particular embodiments, Nyquist wavelength-division multiplexing (N-WDM) may be used in subcarriers of a super-channel. In N-WDM, optical pulses having a nearly rectangular spectrum are packed together in the frequency domain with a bandwidth approaching the Baud rate (see also FIG. 2).

Optical transport network 101 may include one or more optical transmitters (Tx) 102 configured to transmit optical signals through optical network 101 in specific wavelengths or channels. Transmitters 102 may comprise any system, apparatus or device configured to convert an electrical signal into an optical signal and transmit the optical signal. For example, transmitters 102 may each comprise a laser and a modulator configured to receive electrical signals and modulate the information contained in the electrical signals onto a beam of light produced by the laser at a particular wavelength and transmit the beam carrying the signal throughout the network. As shown in FIG. 1, transmitters 102 may be under the control of optical transport network (OTN) controller 120, which, as depicted, may represent a controller for the transmission side of optical transport network 101. OTN controller 120 may, for example, provide control signals to each of transmitters 102 specifying a frequency (or wavelength) of a laser source used for modulating an optical signal generated by transmitter 102.

Multiplexer 104 may be coupled to transmitters 102 and may be any system, apparatus or device configured to combine the signals transmitted by transmitters 102, in individual wavelengths, into a single WDM, DWDM, and/or super-channel signal.

Amplifiers 108 may amplify the multi-channeled signals within optical transport network 101. Amplifiers 108 may be positioned before and/or after certain lengths of fiber 106. Amplifiers 108 may comprise any system, apparatus, or device configured to amplify signals. For example, amplifiers 108 may comprise an optical repeater that amplifies the optical signal. This amplification may be performed with opto-electrical or electro-optical conversion. In some embodiments, amplifiers 108 may comprise an optical fiber doped with a rare-earth element. When a signal passes through the fiber, external energy may be applied to excite the atoms of the doped portion of the optical fiber, which increases the intensity of the optical signal. As an example, amplifiers 108 may comprise an erbium-doped fiber amplifier (EDFA). However, any other suitable amplifier, such as a semiconductor optical amplifier (SOA), may be used.

OADMs 110 may also be coupled to optical transport network 101 via fibers 106. OADMs 110 comprise an add/drop module, which may include any system, apparatus or device configured to add and/or drop optical signals from fibers 106. After passing through an OADM 110, a signal may travel along fibers 106 directly to a destination, or the signal may be passed through one or more additional OADMs 110 before reaching a destination.

Many existing optical networks are operated at 10 gigabit-per-second (Gbps) or 40 Gbps signal rates with 50 gigahertz (GHz) of channel spacing in accordance with International Telecommunications Union (ITU) standard wavelength grids, also known as fixed-grid spacing, which is compatible with conventional implementations of OADMs 110 and with conventional implementations of multiplexers 104 and demultiplexers 105. However, as data rates increase to 100 Gbps and beyond, the wider spectrum requirements of such higher data rate signals often require increasing channel spacing. In traditional fixed grid networking systems supporting signals of different rates, the entire network system typically must be operated with the coarsest channel spacing (100 GHz, 200 GHz, etc.) that can accommodate the highest rate signals. This may lead to an over-provisioned channel spectrum for lower-rate signals and lower overall spectrum utilization.

Thus, in certain embodiments, optical transport network 101 may employ components compatible with flexible grid optical networking that enables specifying a particular frequency slot per channel. For example, each wavelength channel of a WDM transmission may be allocated using at least one frequency slot. Accordingly, one frequency slot may be assigned to a wavelength channel whose symbol rate is low, while a plurality of frequency slots may be assigned to a wavelength channel whose symbol rate is high. Thus, in certain embodiments of optical transport network 101, OADM 110 may represent a reconfigurable OADM (ROADM) that is capable of adding or dropping individual or multiple wavelengths of a WDM, DWDM, and/or super-channel signal carrying data channels to be added or dropped in the optical domain, for example, using a wavelength selective switch (WSS).

Optical transport network 101 may also include one or more demultiplexers 105 at one or more destinations of network 101. Demultiplexer 105 may comprise any system apparatus or device that may act as a demultiplexer by splitting a single WDM signal into its individual channels. For example, when optical transport network 101 transmits a forty channel DWDM signal, demultiplexer 105 may divide the single, forty channel DWDM signal into forty separate signals according to the forty different channels. It will be understood that different numbers of channels and/or subcarriers may be transmitted and demultiplexed in optical transport network 101, in various embodiments.

Optical transport network 101 may also include receivers 112 coupled to demultiplexer 105. Each receiver 112 may be configured to receive signals transmitted in a particular wavelength or channel, and process the signals for the information that they contain. Accordingly, network 101 may include at least one receiver 112 for every channel of the network. As shown in FIG. 1, receivers 112 may be under the control of optical transport network (OTN) controller 130, which, as depicted, may represent a controller for the receiver side of optical transport network 101. OTN controller 130 may, for example, receive error rate measurements, such as a bit error rate (BER) from receivers 112 and transmit the BER values via feedback link 122 to OTN controller 120. In this manner, operational feedback control of various parameters, such as modulation frequencies used by transmitters 102, may be performed to maintain a desired optical signal to noise ratio (OSNR) in optical transport network 101.

Optical networks, such as optical transport network 101, may further employ modulation schemes to convey information in the optical signals over the optical fibers. Such modulation schemes may include phase-shift keying ("PSK"), frequency-shift keying ("FSK"), amplitude-shift keying ("ASK"), and quadrature amplitude modulation ("QAM"). In PSK, the information carried by the optical signal may be conveyed by modulating the phase of a reference signal, also known as a carrier wave, or simply, a carrier. The information may be conveyed by modulating the phase of the signal itself using differential phase-shift keying ("DPSK"). In QAM, the information carried by the optical signal may be conveyed by modulating both the amplitude and phase of the carrier wave. PSK may be considered a subset of QAM, wherein the amplitude of the carrier waves is maintained as a constant.

PSK and QAM signals may be represented using a complex plane with real and imaginary axes on a constellation diagram. The points on the constellation diagram representing symbols carrying information may be positioned with uniform angular spacing around the origin of the diagram. The number of symbols to be modulated using PSK and QAM may be increased and thus increase the information that can be carried. The number of signals may be given in multiples of two. As additional symbols are added, they may be arranged in uniform fashion around the origin. PSK signals may include such an arrangement in a circle on the constellation diagram, meaning that PSK signals have constant power for all symbols. QAM signals may have the same angular arrangement as that of PSK signals, but include different amplitude arrangements. QAM signals may have their symbols arranged around multiple circles, meaning that the QAM signals include different power for different symbols. This arrangement may decrease the risk of noise as the symbols are separated by as much distance as possible. A number of symbols "m" may thus be used and denoted "m-PSK" or "m-QAM."

Examples of PSK and QAM with a different number of symbols can include binary PSK ("BPSK" or "2-PSK") using two phases at 0° and 180° (or in radians, 0 and $\pi$) on the constellation diagram; or quadrature PSK ("QPSK", "4-PSK", or "4-QAM") using four phases at 0°, 90°, 180°, and 270° (or in radians, 0, $\pi/2$, $\pi$, and $3\pi/2$). Phases in such signals may be offset. Each of 2-PSK and 4-PSK signals may be arranged on the constellation diagram. Certain m-PSK signals may also be polarized using techniques such as dual-polarization QPSK ("DP-QPSK"), wherein separate m-PSK signals are multiplexed by orthogonally polarizing the signals. Also, m-QAM signals may be polarized using techniques such as dual-polarization 16-QAM ("DP-16-QAM"), wherein separate m-QAM signals are multiplexed by orthogonally polarizing the signals.

Modifications, additions or omissions may be made to optical transport network 101 without departing from the scope of the disclosure. For example, optical transport network 101 may include more or fewer elements than those depicted. Additionally optical transport network 101 may include additional elements not expressly shown, such as a dispersion compensation module. Also, as mentioned above, although depicted as a point to point network, optical transport network 101 may comprise any suitable network for transmitting optical signals such as a ring or mesh network.

In operation, optical transport network 101 may be used to transmit a super-channel, in which a plurality of subcarrier signals are densely packed in a fixed bandwidth band and may be transmitted at very high data rates, such as 400 Gb/s, 1 Tb/s, or higher. Furthermore, a super-channel may be well suited for transmission over very long distances, such as hundreds of kilometers, for example. A typical super-channel may comprise a set of subcarriers that are frequency multiplexed to form a single channel and which are transmitted through the entire network as one entity. The subcarriers within the super-channel may be tightly packed to achieve high spectral efficiency. In order to minimize linear crosstalk between neighboring subcarriers in the super-channel, Nyquist filtering may be applied at the transmitter side to shape the subcarrier frequency bands (see also FIG. 2).

Recently, it has been discovered that subcarriers in a super-channel may exhibit different degrees of BER, and accordingly OSNR, which may be observed at receivers 112. Such a variance in BER among the subcarriers of a super-channel may be undesirable for an operator of optical transport network 101. The operator (or network service provider) of optical transport network 101 may desire uniform performance for every transmitted channel for operational and/or economic reasons. As will be described in further detail herein, optical transport network 101 may implement variable subcarrier spectral allocation to reduce or eliminate an OSNR variance among subcarriers of a super-channel. Specifically, a modulation frequency of certain subcarriers (i.e., the subcarrier frequency bands) within the fixed bandwidth super-channel may be shifted to optimize a combination of linear and non-linear interactions that are responsible for OSNR penalties during transmission, resulting in an overall improvement in both OSNR and OSNR uniformity among the subcarriers.

As noted above, optical super-channels may represent a promising solution for transmission of signals at 400 Gb/s and 1 Tb/s data rate per channel. Various transmission experiments with super-channels have revealed that each subcarrier within a super-channel may experience different amounts of linear and nonlinear interactions with neighboring subcarriers, resulting in different received OSNR penalties. For example, an intermediate band of the super-channel may suffer from larger non-linear interaction compared to subcarriers in an edge band of the super-channel. In order to compensate for such effects, a variable subcarrier spectral allocation method, as described herein, may shift intermediate subcarrier bands away from a center frequency of the fixed super-channel band. In other words, certain intermediate subcarrier bands may be shifted in the frequency domain towards the edges of the fixed super-channel band. In this manner, slightly larger nonlinear and/or linear crosstalk may be intentionally induced on the edge subcarriers in the super-channel band, while nonlinear crosstalk effects may be significantly reduced on the intermediate subcarriers. Such a variable subcarrier spectral allocation may result in overall reduced OSNR degradation, when viewed across all subcarriers in the super-channel, and may further equalize OSNR penalties for all subcarriers.

Figure 2:
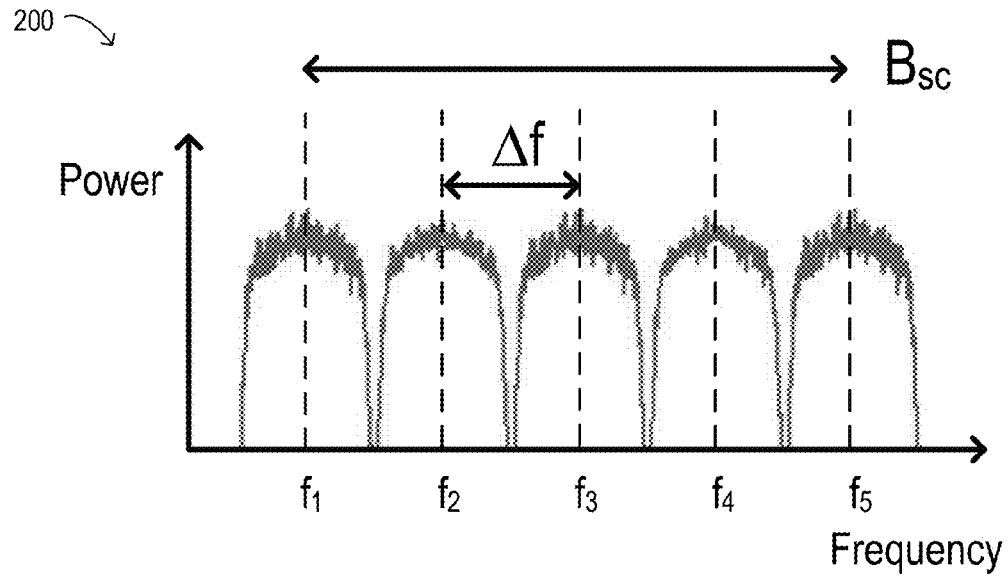
FIG. 2 shows selected elements of an embodiment of a super-channel frequency spectrum.

Turning now to FIG. 2, selected elements of an embodiment of a super-channel is shown as simulated frequency spectrum 200, which depicts five (5) subcarriers. While the data used for simulated frequency spectrum 200 are not actual measured values, the illustrated frequency spectrum may be characteristic of an actual super-channel. In simulated frequency spectrum 200, the subcarriers may each be modulated with 200 GB/s DP-16-QAM signals. Furthermore, each subcarrier band has been electrically Nyquist pulse shaped in the transmitter using a root raised cosine method using a roll-off factor of 0.15. As shown in FIG. 2, $B_{SC}$ may represent the fixed super-channel transmission band, while $\Delta f$ may represent the subcarrier spacing. In one embodiment, the subcarrier spacing $\Delta f$ is 35 GHz and may be uniform between each center frequency $f_1$, $f_2$, $f_3$, $f_4$, and $f_5$, respectively corresponding to the subcarrier bands. The spacing $\Delta f$ may be selected to be wide enough to prevent any significant linear crosstalk between adjacent subcarriers. The optical signal of each subcarrier may be multiplexed using an optical coupler to form the single super-channel in the fixed transmission band $B_{SC}$ having an aggregate data rate of 1 Tb/s.

In typical DWDM networks, it is known that system performance may depend on an allocation of each wavelength channel on the wavelength grid, such that a longer wavelength channel may suffer from smaller nonlinear impairments compared to a shorter wavelength channel. In case of super-channel-based WDM systems, in addition to the wavelength dependency of the subcarrier error rate across the transmission band, $B_{SC}$, a dependency of individual subcarrier error rate (or OSNR at the receiver) on spectral allocation of the subcarrier within the super-channel has now been observed in the form of linear and nonlinear impairments (i.e., cross-talk). Linear cross-talk may be observed between two adjacent subcarrier bands (i.e., inter-subcarrier) and may depend on a degree or extent of overlap in the frequency domain of the adjacent subcarrier bands. The use of Nyquist pulse shaping, as shown in FIG. 2, may represent an effective means for maintaining a minimum level of linear cross-talk between adjacent subcarriers, at least in part due to the nearly vertical edges of the Nyquist-shaped subcarrier bands (i.e. pulses) that do not substantially overlap each other in the frequency domain. Non-linear cross-talk may also be observed and may arise from non-linear interactions during fiber transmission. The non-linear interactions may include phenomena such as cross-phase modulation (XPM) and four-wave mixing, among others. Cross-phase modulation may occur when phase and/or amplitude information from one subcarrier is modulated to an adjacent subcarrier in the super-channel. In four-wave mixing, three wavelengths may interact to create a fourth wavelength that may coincide with a wavelength of a subcarrier, and may lead to undesirable variations in peak power and/or other types of signal distortion on the affected subcarrier. Furthermore, non-linear effects may comprise inter-subcarrier and intra-subcarrier components. Since non-linear interactions occur during fiber transmission and may not depend on a degree of overlap of the subcarrier frequency bands, Nyquist pulse shaping may be ineffective in resolving problems with non-linear cross-talk in a super-channel. As will be described in further detail herein, at least some of the subcarrier bands depicted in simulated frequency spectrum 200 may be shifted in the frequency domain to reduce the variation in OSNR between the individual subcarrier bands.

Figure 3:
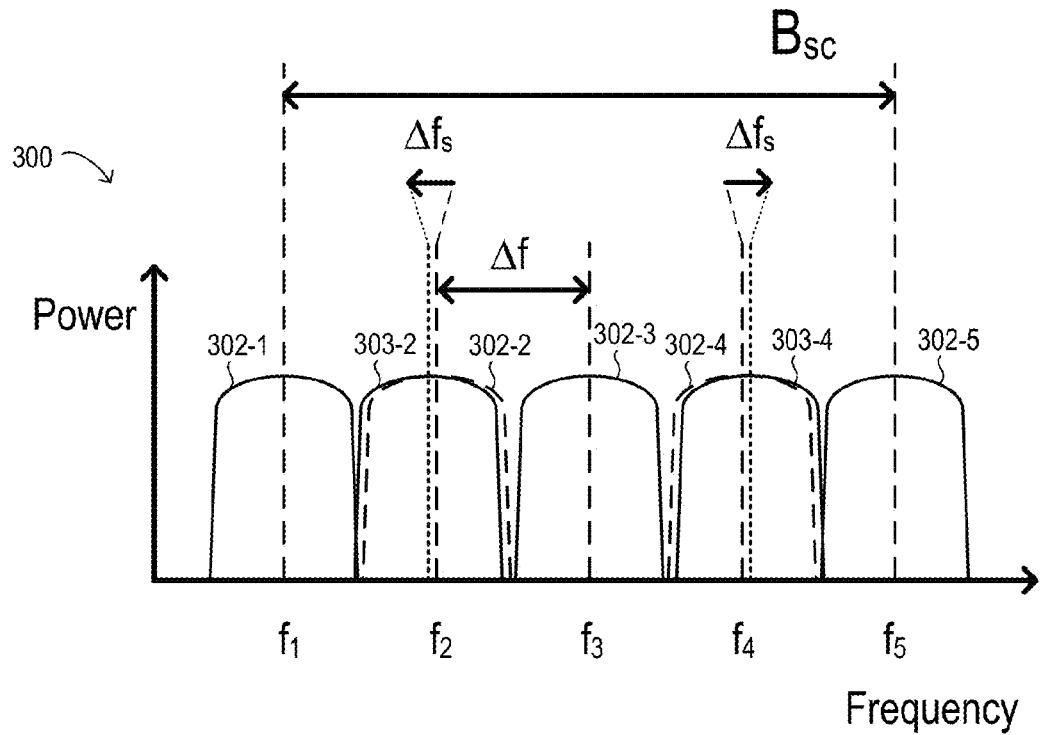
FIG. 3 shows selected elements of an embodiment of a super-channel frequency spectrum.

Turning now to FIG. 3, selected elements of an embodiment of a super-channel are shown as simulated frequency spectrum 300, which depicts five (5) subcarriers 302. As shown in FIG. 3, subcarriers 302 are depicted in simplified form for descriptive clarity, yet may still correspond to the subcarrier bands depicted in simulated frequency spectrum 200 (see FIG. 2). In simulated frequency spectrum 300, subcarrier bands 302-1 and 302-5 are designated as "edge bands" or "edge subcarriers" or "edge subcarrier bands" in reference to their edge positions within the super-channel subcarrier bands, and may define an overall fixed bandwidth $B_{SC}$ of the super-channel. Also, $\Delta f$ may represent the subcarrier spacing, which may normally be uniformly distributed across $B_{SC}$. In the arrangement shown in FIG. 3 with 5 subcarrier bands (i.e., an odd number of subcarrier bands), subcarrier band 302-3 is designated a center subcarrier band, such that the frequency $f_3$ of subcarrier band 302-3 is given by the average value of frequencies $f_1$ and $f_5$. The remaining subcarrier bands 302-2 and 302-4 are termed "intermediate bands" or "intermediate subcarriers" or "intermediate subcarrier bands" to which frequency shift $\Delta f_s$ may be applied. Specifically, intermediate subcarrier band 302-2 may be shifted from frequency $f_2$ away from center subcarrier band 302-3 towards edge subcarrier band 302-1 by an amount $\Delta f_s$, while intermediate subcarrier band 302-4 may be shifted from frequency $f_4$ away from center subcarrier band 302-3 towards edge subcarrier band 302-5 by an amount $\Delta f_s$. For example, when $\Delta f$ is 35 GHz, $\Delta f_s$ may be about 1 GHz. Other values for $\Delta f_s$ may be used in different embodiments. After applying the frequency shift $\Delta f_s$, the shifted intermediate subcarrier bands are shown as bands 303-2 and 303-4, respectively. In other words, frequency shift $\Delta f_s$ may represent a change in optical frequency towards a closest optical frequency selected from the first optical frequency $f_1$ and the last optical frequency $f_5$. It is noted that frequency shift $\Delta f_s$ may be applied symmetrically in the frequency domain with respect to a center frequency of the fixed super-channel band $B_{SC}$.

In simulated frequency spectrum 300 of FIG. 3, when $\Delta f_s$ is applied in a symmetric manner (i.e., towards the edge bands) to $f_2$ and $f_4$, the band spacing between $f_3/f_2$ and between $f_3/f_4$ is increased. As a result of this increase in band spacing, OSNR penalties induced by subcarriers $f_2$ and $f_4$ on subcarrier $f_3$ arising from non-linear inter-channel cross-talk is reduced. Similarly, the non-linear inter-channel cross-talk induced by subcarrier $f_3$ on both subcarriers $f_2$ and $f_4$ is also reduced, because of the increased band spacing. At the same time, both linear and non-linear inter-channel cross-talk induced between neighboring subcarriers pairs $f_1/f_2$ and subcarriers pairs $f_4/f_5$ (in both directions within each neighboring pair of subcarriers) is slightly increased due to the reduced band spacing between these subcarrier pairs. The amount of increase of the linear cross-talk may be very small compared to the decrease of non-linear cross-talk achieved in this manner. Thus, the overall OSNR penalty induced by non-linear cross-talk for subcarriers $f_2$ and $f_4$ is significantly reduced (see also FIG. 4B, element 404-2) and the variation of OSNR penalties among all the subcarriers of the super-channel is also reduced. Accordingly, as a result of frequency shift $\Delta f_s$, non-linear inter-subcarrier impairments to subcarrier bands $f_2$, $f_3$, and $f_4$ may be significantly reduced, while other linear and non-linear impairments to subcarrier bands $f_1$, $f_5$ and $f_2$, $f_4$ may be very slightly increased, when all five subcarrier bands are transmitted as a super-channel.

Although the example spectra of a super-channel depicted in FIGS. 2 and 3 are shown with 5 subcarrier bands, it is noted that the methods described herein may be practiced on super-channels having different numbers of subcarrier bands. For example, when the super-channel has an even number of subcarriers, such as 4, 6, 8, 10, etc., the intermediate bands may comprise all the subcarrier bands except the two edge subcarrier bands, since no center subcarrier band is present. The two edge bands and a center band (when present) may be omitted from application of frequency shift $\Delta f_s$ in various super-channel configurations. Also, in instances where a number of intermediate subcarrier bands (i.e., excluding the edge bands and a center band, when present) is four or more, a magnitude of the frequency shift $\Delta f_s$ may depend on a position of an intermediate subcarrier band within the super-channel. For example, when a total number of subcarrier bands is at least 6 (not shown in the figures), a first pair of intermediate subcarrier bands immediately adjacent to the edge bands may be shifted in frequency by an amount $\Delta f_{s1}$ towards the edge bands, while a second pair of intermediate subcarrier bands respectively next to the first pair may be shifted in frequency by an amount $\Delta f_{s2}$ towards the edge bands, such that, in different embodiments, either of the following relationships may be true: $\Delta f_{s1} \neq \Delta f_{s2}$ and $\Delta f_{s1} = \Delta f_{s2}$. The methods for applying frequency shift $\Delta f_s$ may accordingly be practiced with super-channels having different numbers of subcarriers. In operation, frequency shift $\Delta f_s$ may be determined or applied using OTN controller 120 to specify a laser frequency per subcarrier that may be individually tuned by each of transmitters 102 (see FIG. 1). It is further noted that applying frequency shift $\Delta f_s$ may leave fixed bandwidth $B_{SC}$ of the super-channel unchanged.

Figure 4A:
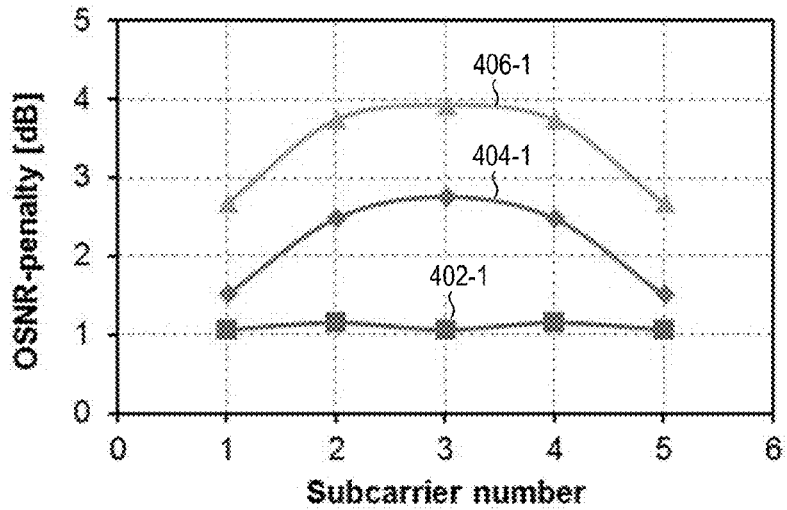
FIGS. 4A and 4B are plots showing selected elements of embodiments of OSNR penalties.

Turning now to FIG. 4A, plot 400-1 shows an example embodiment of OSNR penalties for the 5 subcarrier super-channel discussed above with respect to FIGS. 2 and 3 without variable subcarrier spectral allocation, as described herein. The OSNR penalties shown in FIG. 4A may be derived from BER measurements and/or simulated measurements and may be representative of actual measurement data. In plot 400-1, values 402-1 may represent OSNR penalties resulting from intra-subcarrier non-linear interaction, which are non-linear interactions within each subcarrier. It is noted that values 402-1 represent relatively small OSNR penalties. In plot 400-1, values 404-1 may represent OSNR penalties resulting from inter-subcarrier non-linear interaction, that is, non-linear interactions between neighbor subcarriers in the super-channel. Values 404-1 for non-edge subcarriers 2, 3, and 4 show significant variance when compared to values 404-1 for edge subcarriers 1 and 5, which is undesirable. Also in plot 400-1, total values 406-1 for the OSNR penalty, including both linear and non-linear effects, largely follow the curve shape for values 404-1, indicating that other effects, such as linear interactions, may be relatively insignificant. Thus, plot 400-1 may show that non-linear inter-subcarrier interactions dominate in their contribution to the total OSNR penalty given by values 406-1.

Figure 4B:
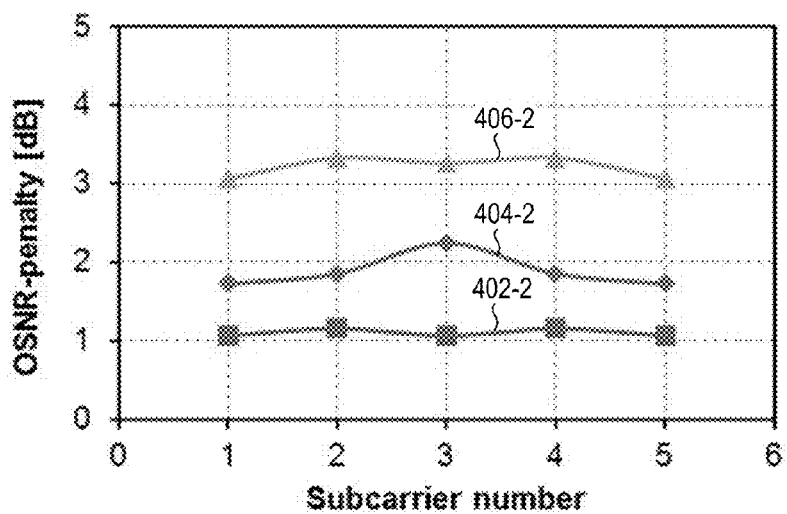

Turning now to FIG. 4B, plot 400-2 shows an example embodiment of OSNR penalties for the 5 subcarrier super-channel discussed above with respect to FIGS. 2 and 3 with variable subcarrier spectral allocation, as described herein and depicted in FIG. 3. The OSNR penalties shown in FIG. 4B may be derived from BER measurements and/or simulated measurements and may be representative of actual measurement data. In plot 400-2, values 402-2 may represent OSNR penalties resulting from intra-subcarrier non-linear interaction, which are non-linear interactions within each subcarrier. It is noted that values 402-2 are substantially similar to values 402-1 (see FIG. 4A). In plot 400-2, values 404-2 may represent OSNR penalties resulting from inter-subcarrier non-linear interaction, that is, non-linear interactions between neighbor subcarriers in the super-channel. Due to the variable spectral allocation of the intermediate subcarriers 2 and 4, values 404-2 for non-edge subcarriers 2, 3, and 4 now show substantially less variance when compared to values 404-2 for edge subcarriers 1 and 5, and show lower values when compared to values 404-1 in FIG. 4A, which is desirable. Also in plot 400-2, the curve of total values 406-2 for the OSNR penalty, including both linear and non-linear effects, is now substantially flatter, indicating reduced variance, which is also desirable. It is further noted that while a total OSNR penalty for subcarriers 1 and 5 has increased slightly in values 406-2 compared to values 406-1 in FIG. 4A, an overall average of values 406-2 is decreased compared to an average of values 406-1, which is also desirable.

Figure 5:
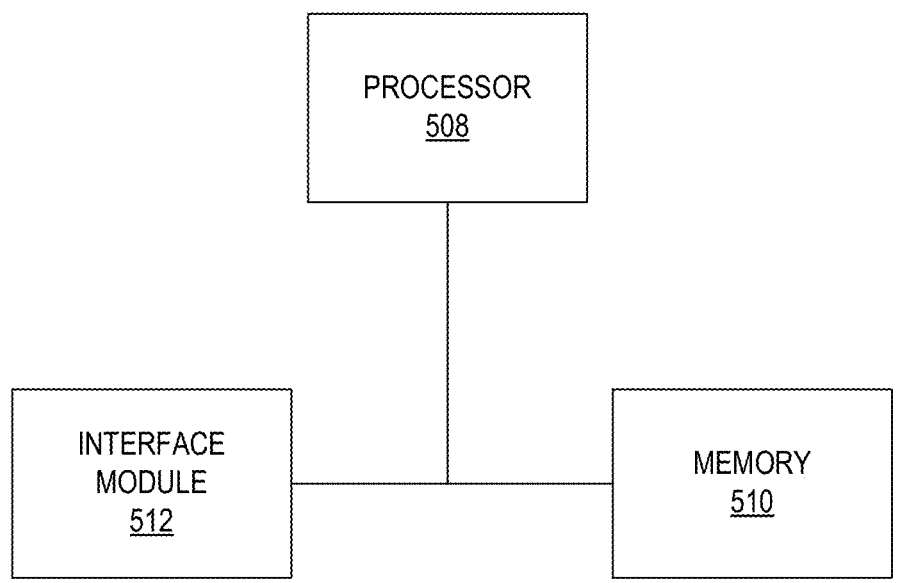
FIG. 5 is a block diagram of selected elements of an embodiment of an OTN controller.

Turning now to FIG. 5 a block diagram of selected elements of an embodiment of OTN controller 500 for controlling certain aspects of optical transport network 101 (see FIG. 1), in accordance with certain embodiments of the present disclosure. OTN controller 500, as shown in FIG. 5, may include processor 508, memory 510, and interface module 512.

In FIG. 5, processor 508 may be configured to execute computer instructions that cause OTN controller 500 to perform the functions and operations described herein. As shown, OTN controller 500 may represent an embodiment of OTN controller 120 and/or 130 (see FIG. 1). The computer instructions may be loaded into the memory 510 for execution by processor 508 and/or data generated, received, or operated on during performance of the functions and operations described herein may be at least temporarily stored in memory 510.

In some embodiments of OTN controller 500, interface module 512 may be configured to receive data concerning an optical signal transmission path in an optical network. That is, interface module 512 may receive data about the optical signal transmission path, such as, fiber type; fiber length; number and/or type of components, such as a dispersion compensation module, ADM, amplifier, multiplexer, or demultiplexer, in the optical signal transmission path; data rate; modulation format of the data; input power of the optical signal; number of signal carrying wavelengths, which may be referred to herein as channels; channel spacing; traffic demand; and/or network topology, among others. For example, interface module 512 may enable system 500 to communicate with various network devices (not shown) along the optical signal transmission path to receive the data concerning the optical signal transmission path. Furthermore, in accordance with the methods disclosed herein, interface module 512 may enable OTN controller 500 to send instructions to any of N number of nodes in the optical signal transmission path. For example, OTN controller 500 may be in communication with transmitters 102 and/or receivers 112, in various embodiments. When multiple instances of OTN controller 500 are present, interface module 512 may be enabled to communicate between the individual instances. For example, interface module 512 may support communication over feedback link 122 between OTN controller 120 and OTN controller 130 (see FIG. 1).

As an illustrative example, in some embodiments, interface module 512 may be configured to interface with a person (i.e., a user) and receive data about the optical signal transmission path. For example, interface module 512 may also include and/or may be coupled to one or more input devices and/or output devices to facilitate receiving data about the optical signal transmission path from the user and/or outputting results to the user. The one or more input and/or output devices (not shown) may include, but are not limited to, a keyboard, a mouse, a touchpad, a microphone, a display, a touchscreen display, an audio speaker, or the like. Alternately or additionally, interface module 512 may be configured to receive data about the optical signal transmission path from a device such as a computing device (not shown).

Figure 6:
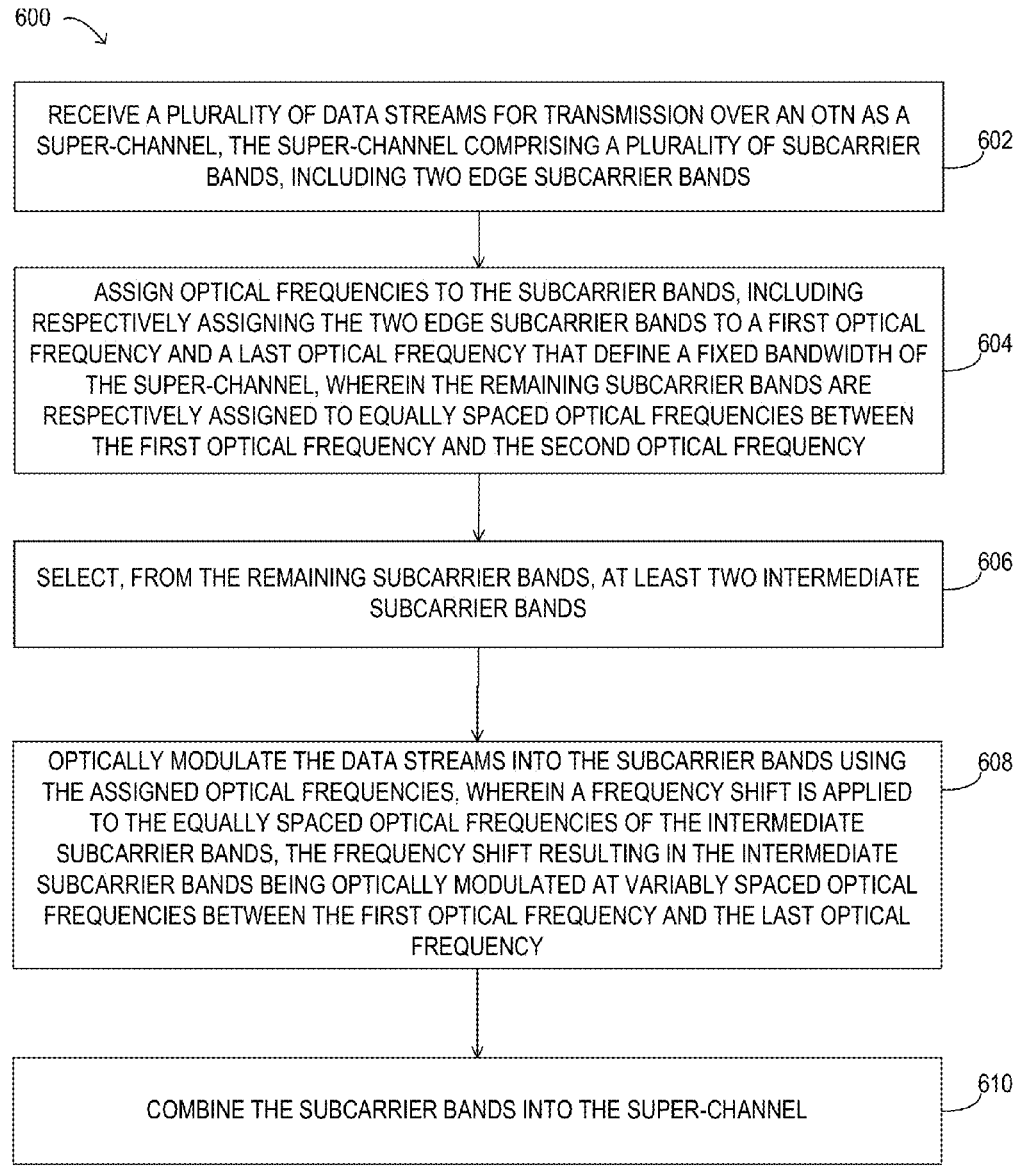
FIG. 6 is a flow chart of selected elements of an embodiment of a method for variable subcarrier spectral allocation.

Turning now to FIG. 6, method 600 for performing variable subcarrier spectral allocation is shown in flow chart form. As shown method 600 may be performed using optical transport network 101 (see FIG. 1). It is noted that operations described with respect to method 600 may be omitted or rearranged in different embodiments.

Method 600 may begin by receiving (operation 602) a plurality of data streams for transmission over an OTN as a super-channel, the super-channel comprising a plurality of subcarrier bands, including two edge subcarrier bands. In certain embodiments, the data streams may directly correspond to the subcarrier bands. In other embodiments, the data streams may be processed in some manner (i.e., interleaved, averaged, decimated, de-interleaved, etc.) to form a subcarrier band corresponding to less than one data stream or to more than one data stream. Optical frequencies may be assigned (operation 604) to the subcarrier bands, including respectively assigning the two edge subcarrier bands to a first optical frequency and a last optical frequency that define a fixed bandwidth of the super-channel, wherein the remaining subcarrier bands are respectively assigned to equally spaced optical frequencies between the first optical frequency and the second optical frequency. From the remaining subcarrier bands, at least two intermediate subcarrier bands may be selected (operation 606). The data streams may be optically modulated (operation 608) into the subcarrier bands using the assigned optical frequencies, wherein a frequency shift is applied to the equally spaced optical frequencies of the intermediate subcarrier bands, the frequency shift resulting in the intermediate subcarrier bands being optically modulated at variably spaced frequencies between the first optical frequency and the last optical frequency. The subcarrier bands may be combined (operation 610) into the super-channel. The fixed bandwidth of the super-channel may correspond to an absolute difference between the frequencies of the two edge subcarrier bands.

While the subject of this specification has been described in connection with one or more exemplary embodiments, it is not intended to limit any claims to the particular forms set forth. On the contrary, any claims directed to the present disclosure are intended to cover such alternatives, modifications and equivalents as may be included within their spirit and scope.

What is claimed is:

1. A method of reducing crosstalk among subcarriers of a super-channel, the method comprising:
   receiving a plurality of data streams for transmission over an optical transport network as the super-channel, the super-channel comprising a plurality of subcarrier bands, including two edge subcarrier bands;
   assigning optical frequencies to the subcarrier bands, including respectively assigning the two edge subcarrier bands to a first optical frequency and a last optical frequency that define a fixed bandwidth of the super-channel, wherein the remaining subcarrier bands are respectively assigned to equally spaced optical frequencies between the first optical frequency and the last optical frequency;
   selecting, from the remaining subcarrier bands, at least two intermediate subcarrier bands;
   optically modulating the data streams into the subcarrier bands using the assigned optical frequencies, wherein a frequency shift is applied to the equally spaced optical frequencies of the intermediate subcarrier bands, the frequency shift resulting in the intermediate subcarrier bands being optically modulated at variably spaced optical frequencies between the first optical frequency and the last optical frequency; and
   combining the subcarrier bands into the super-channel,
   wherein selecting the intermediate subcarrier bands further comprises:
      when the subcarrier bands include an odd number of subcarrier bands, excluding a center subcarrier band from the intermediate subcarrier bands.

2. The method of claim 1, wherein optically modulating the data streams comprises tuning a laser frequency at an optical transmitter.

3. The method of claim 1, wherein the frequency shift represents a change in optical frequency towards a closest optical frequency selected from: the first optical frequency and the last optical frequency.

4. The method of claim 3, wherein a magnitude of the frequency shift depends upon a position of an intermediate subcarrier band in the super-channel.

5. The method of claim 1, wherein the frequency shift is applied symmetrically with respect to an average optical frequency of the first optical frequency and the last optical frequency.

6. The method of claim 1, wherein the frequency shift is applied in response to receiving an error rate measurement on data streams transmitted over the optical transport network using the super-channel.

7. An optical network controller for reducing crosstalk among subcarriers of a super-channel, comprising:
   a processor configured to access memory media; and
   an interface coupled to a plurality of optical transmitters respectively corresponding to a plurality of subcarrier bands included in the super-channel,
   wherein the memory media store instructions executable by the processor, the instructions for using the optical transmitters to:
      receive a plurality of data streams for transmission over an optical transport network as the super-channel, wherein the subcarrier bands of the super-channel include two edge subcarrier bands;
      assign optical frequencies to the subcarrier bands, including respectively assigning the two edge subcarrier bands to a first optical frequency and a last optical frequency that define a fixed bandwidth of the super-channel, wherein the remaining subcarrier bands are respectively assigned to equally spaced optical frequencies between the first optical frequency and the last optical frequency;
      select, from the remaining subcarrier bands, at least two intermediate subcarrier bands;
      optically modulate the data streams into the subcarrier bands using the assigned optical frequencies, wherein a frequency shift is applied to the equally spaced optical frequencies of the intermediate subcarrier bands, the frequency shift resulting in the intermediate subcarrier bands being optically modulated at variably spaced optical frequencies between the first optical frequency and the last optical frequency; and
      output the subcarrier bands for combining into the super-channel,
   wherein the instructions to select the at least two intermediate bands include instructions to:
      when the subcarrier bands include an odd number of subcarrier bands, exclude a center subcarrier from the intermediate subcarriers.

8. The optical network controller of claim 7, wherein the instructions to optically modulate the data streams comprise instructions to enable each of the optical transmitters to:
tune a laser frequency.

9. The optical network controller of claim 7, wherein the frequency shift represents a change in optical frequency towards a closest optical frequency selected from: the first optical frequency and the last optical frequency.

10. The optical network controller of claim 9, wherein a magnitude of the frequency shift depends upon a position of a subcarrier band in the super-channel.

11. The optical network controller of claim 7, wherein the frequency shift is applied symmetrically with respect to an average optical frequency of the first optical frequency and the last optical frequency.

12. The optical network controller of claim 7, wherein the instructions to apply the frequency shift are executed in response to receiving an error rate measurement on data streams transmitted over the optical transport network using the super-channel.

13. An optical network for transmitting a super-channel, comprising:
a plurality of optical transmitters respectively corresponding to a plurality of subcarrier bands included in the super-channel; and
an optical network controller coupled to the optical transmitters, the optical network controller enabled to use the optical transmitters to:
receive a plurality of data streams for transmission over an optical transport network as the super-channel, wherein the subcarrier bands of the super-channel include two edge subcarrier bands;
assign optical frequencies to the subcarrier bands, including respectively assigning the two edge subcarrier bands to a first optical frequency and a last optical frequency that define a fixed bandwidth of the super-channel, wherein the remaining subcarrier bands are respectively assigned to equally spaced optical frequencies within the fixed bandwidth;
select, from the remaining subcarrier bands, at least two intermediate subcarrier bands;
optically modulate the data streams into the subcarrier bands using the assigned optical frequencies, wherein a frequency shift is applied to the equally spaced optical frequencies of the intermediate subcarrier bands, the frequency shift resulting in the intermediate subcarrier bands being optically modulated at variably spaced optical frequencies within the fixed bandwidth; and
output the subcarrier bands for combining into the super-channel,
wherein the optical network controller is to use the optical transmitters to:
when the subcarrier bands include an odd number of subcarrier bands, exclude a center subcarrier from the intermediate subcarriers.

14. The optical network of claim 13, wherein using the transmitters to optically modulate the data streams comprises using each of the optical transmitters to:
tune a laser frequency.

15. The optical network of claim 13, wherein the frequency shift represents a change in optical frequency towards a closest optical frequency selected from: the first optical frequency and the last optical frequency.

16. The optical network of claim 15, wherein a magnitude of the frequency shift depends upon a position of a subcarrier band in the super-channel.

17. The optical network of claim 13, wherein the frequency shift is applied symmetrically with respect to an average optical frequency of the first optical frequency and the last optical frequency.

18. The optical network of claim 13, wherein applying the frequency shift is performed in response to receiving an error rate measurement on data streams transmitted over the optical transport network using the super-channel.

* * * * *